2,820,159

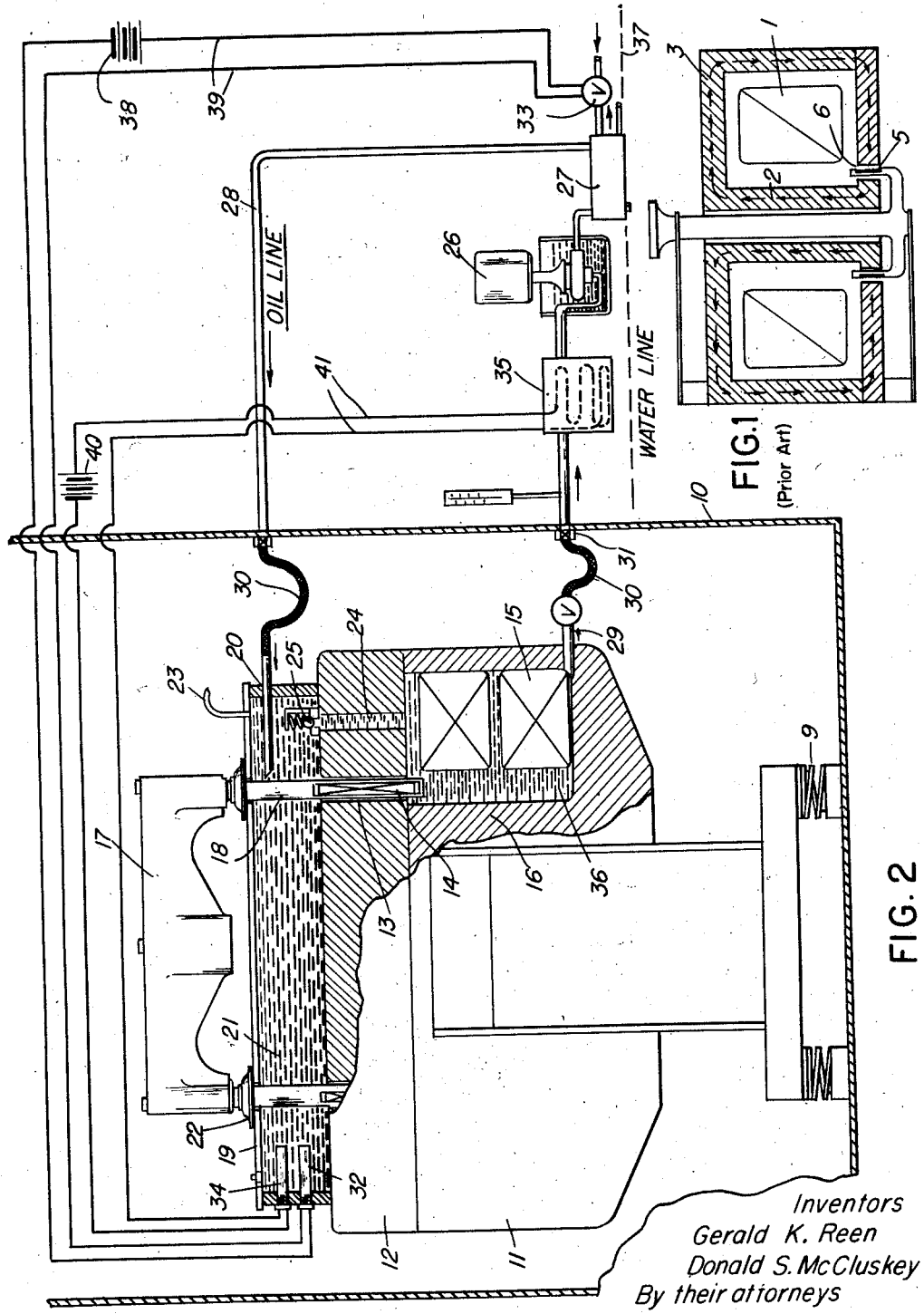

ELECTROMAGNETIC VIBRATION EXCITER

Gerald K. Reen, Woodbridge, and Donald S. McCluskey, New Haven, Conn., assignors, by mesne assignments, to Textron Inc., a corporation of Rhode Island Application September 9, 1954, Serial No. 454,961

5 Claims. (Cl. 310—16)

This invention relates to an improvement in electromagnetic vibration exciters and more particularly to means for obtaining materially greater generated forces from a given exciter design. The improvement also permits an exciter to be used for vibration testing under extreme environmental conditions. It has been shown that many mechanical and electrical failures of components used in high altitude flight result from the combined conditions of high altitude and vibration.

Many test specifications call for environmental testing of electronic and associated equipment under extreme conditions of varying humidity, temperature and pressure. It is also required that the specimens be subjected to vibration over a broad frequency range while being subjected to these extreme environmental conditions. Vibratory excitation of any type requires close mechanical coupling between exciter and specimen. A convenient means of generating vibratory forces over a wide frequency range is by use of an electromagnetic vibration exciter. Assuming the use of such an exciter, the problem is to couple the specimen undergoing environmental testing to the exciter and still protect the exciter from the extreme temperature and pressures. There are several possible methods of accomplishing this. Two of them will be referred to.

One method is to mount the specimen inside an environmental chamber and vibrate it by means of a drive rod connecting a vibration exciter external to the chamber to the specimen. If this is done a seal must be provided between the drive rod and the chamber. This seal must allow reasonably large displacement of the drive rod, and withstand the reversed stresses that this develops. This seal must be pressure-tight and withstand pressure loading. It must also act as an insulator between the chamber interior and the atmosphere. In addition, it must not couple vibratory forces to the chamber structure. Such a seal is extremely difficult to design. In addition, mounting the exciter externally to the chamber results in a reasonably long connection between the specimen and the exciter which limits the upper frequency range of such a device due to resonances in the driving member.

The other method of simultaneously accomplishing environmental and vibratory testing is to mount the exciter inside the environmental chamber. In this manner the specimen can be closely coupled to the exciter and many of the problems discussed are eliminated. However, problems associated with cooling the exciter arise. The purpose of this invention is to provide a means of allowing the operation of an electromagnetic vibration exciter inside an environmental test chamber.

The present types of vibration exciters or shakers consist of a fixed field energized by direct current and a reciprocating armature supplied with alternating current. The specimen to be tested is mounted on a table which is attached to the armature by mechanical driving elements. The force derived from the interaction of the alternating current in the armature with the magnetic flux of the fixed field results in an alternating acceleration of the combined masses of the armature, table, driving elements and specimen.

In the drawings:

Fig. 1 is a diagrammatic view in section of the common form of prior art exciter of the center pole and pot construction.

Fig. 2 is a diagrammatic view of an exciter and environmental chamber according to our invention.

In the form of the prior art the magnet coils 1 surround the center pole 2, and the magnet structure 3, shaped like a pot 4, offers a path of low reluctance to the magnetic flux. The armature 5 is suspended in an air gap 6 in the magnetic path.

A magnetic field in the iron, of high flux density, set up by the direct current in the magnet coils, is forced across this air gap 6. An alternating current is supplied to the armature. The magnitude of the resulting alternating force on the armature 5 is directly proportional to the current in the armature, the length of the armature winding and the flux density passing through the armature. This alternating force accelerates the combined mass of the moving element and specimen, forcing the entire mechanical system into vibration.

It is obvious from the above discussion of exciters of the prior art that their operation results in the dissipation of electrical energy. The resulting heat is normally removed by circulating cooling air through the exciter. If a conventional exciter is mounted in a vacuum chamber, a complete seal between the electrical windings of the exciter and interior of the chamber must be provided. To be practical, such a seal would probably be installed around each of the driving elements connecting the table to the armature. This seal would have to be capable of allowing large amplitudes of motion between the exciter table and body, resulting in repeated reverse stressing. It would have to be pressure-tight and would have to withstand pressure differentials of at least 15 p. s. i. under vacuum conditions. In typical cases, the pressure ranges in the chamber could vary from high vacuum to high pressures. Also, the cooling air would have to be brought to the exciter through large ducts which result in pressure loss and necessitate larger blowers. In addition, if the chamber is operated at elevated temperatures, there will be heat flow from the chamber to the exciter. This additional heat would have to be removed by the cooling air and in most cases this would require lowering of the rating of the equipment. The primary advantage of this invention is that it allows mounting of the vibration exciter in an environmental chamber as discussed, but it eliminates the problems associated with a conventional atmospheric air cooling system by replacing it with a system which can be operated at the same pressure as the chamber interior.

The cooling system described in this invention consists of submerging all electrical heat generating coils in the exciter in special high di-electric strength, low vapor pressure oil. The oil must have low vapor pressure in order to minimize evaporation when the chamber is evacuated, since the oil will at all times be at the same pressure as the chamber interior. The exciter construction can be of the pot design shown in Fig. 2, open on the top to chamber pressure. The oil depth can be adjusted to cover all electrical connections, thereby eliminating arcing difficulties which would otherwise be present under vacuum conditions. By utilizing this system, the cooling medium operates at the internal chamber pressure. In this manner the pressure differential between the chamber and atmosphere appears across the conventional piping associated with the cooling system and not across a moving member. Thus the problem of a pressure seal capable of withstanding vibration and large relative motion has been eliminated. If it is desired to rotate the vibration exciter so as to allow vibration in a horizontal direction, simple silicon rubber seals around the exciter driving elements can be used. Such rubber seals will withstand large amplitudes but they will not stand large pressure differentials. However, the pressure differential, due to the head of oil in the exciter, is very small, being approximately 0.5 p. s. i. for conventional exciters compared to the 15 p. s. i. differential which would be experienced between atmosphere and high vacuum conditions.

A preferred form of the closed cooling system used in this invention is shown in Fig. 2. The exciter is mounted on springs 9 in an environmental or vacuum chamber 10 (see Fig. 2). The exciter body 11 is of the center pole and pot design with a cover 12 together forming a complete magnetic iron path except for the annular air gap 13 in which is suspended the driving armature 14. The direct current field coils 15 surround the center pole. The armature 14 is attached to the table 17 by the driving elements 18. A magnetic shield 19 is mounted on the cover by an oil-tight ring 20. The shield 19 has clearance holes for the driving elements 18. The exciter body 11 is filled with oil 21 to within a fraction of an inch of the shield 19, covering all of the electrical coils and connections. A flexible seal 22, such as silicon rubber diaphragms or metallic bellows, is provided around each driving element. These seals retain the oil when the exciter is rotated horizontally. A vent 23 in the shield assures that there is no pressure differential across the seals other than the liquid head. Oil relief holes 24 with check valves 25 are provided in the cover 12. These prevent oil pressure buildup in the body due to pumping action of the armature 14 at low frequencies and high amplitudes. The cooling oil is circulated by a constant pressure pump 26 through a heat exchanger 27 which can be oil to water, oil to air, etc. The cold oil is injected over the center pole 16 and flows inward over the armature coil which is the most critical area to cool. The check valves 25 prevent by-passing the armature coil. After passing down around the armature 14, the oil enters the pot 36 in which the field coils 15 are located. Thence hot oil is pumped from the outlet 29 to the heat exchanger 27 by oil lines 28. Flexible hydraulic lines 30 and quick disconnect couplings 31 make removal of the exciter simple.

We provide the following thermostatic means associated with the oil-filled enclosure formed by the ring 20 and shield 19 to indicate changes in oil temperature. These means control oil temperature changing means outside the environmental chamber, all as now described. A thermostat 32 in oil over the exciter body actuates a valve 33 in a waterline 37 when the oil temperature rises. The thermostat is connected to a battery or source of power 38 by wires 39 going to the valve 33 in the waterline. A second thermostat 34 in the oil over the exciter body energizes oil heater 35 when the oil temperature falls due to extreme low temperatures in the chamber. The second thermostat 34 is also connected by wires 41 to a source of power 40 and heater 35.

The prime advantage of the cooling system described in this application is the fact that the cooling medium operates at the same pressure as the environmental chamber, thereby simplifying the problem of sealing the exciter. However, another important advantage of using oil cooling is the fact that the heat transfer coefficient of an oil to metal boundary is many times greater than an air to metal boundary. Therefore, the heat dissipation (watts per square inch of surface area) of the armature coil and the field coils can be greatly increased in the case of the oil-cooled exciter. The prime limitation of force output of exciters of the prior art has been removal of heat from the armature coils. Consequently, oil cooling will allow materially greater generated forces from a given exciter design if the additional driving power is supplied. Tests show that oil cooling allows at least three times the force output obtainable with the same exciter when air-cooled in the manner used in the prior art. This oil-cooling with forced circulation, combined with relief vents in the exciter cover to reduce the damping effect of the oil at high velocities, opens the way to considerably advanced ratings of conventional exciters of the prior art.

The increased cooling capacity of the oil system over a conventional air system allows the exciter to be operated in the chamber under elevated temperatures. Heat transferred from the chamber through the exciter body is as readily removed by the oil as that generated internally. The upper temperature limit at which the chamber can be operated is then determined by the temperature characteristics of the magnesium table and not by the temperature limit of the armature coil.

What is claimed is:

1. An electromagnetic vibration exciter having a stationary body and a cover therefor together forming a magnetic flux path with an annular air gap, field coils in the body adapted to create a magnetic flux, a reciprocatory armature suspended freely in the air gap, a table for a specimen and driving elements attaching the table to the armature; in combination with an oil enclosure on the cover spaced above the air gap, a forced oil circulation system connected to the exciter adapted to deliver oil on one side of the air gap and to draw it away on the other, and a relief vent in the cover connecting the oil on the two sides of the cover to reduce the damping effect of the oil at high velocity.

2. An electromagnetic vibration exciter according to claim 1, in combination with an environmental chamber enclosing the exciter, there being a shield forming part of the oil enclosure and a vent in the shield, the vent in the shield being open to the interior of the chamber; whereby the cooling oil operates at the same pressure as the environmental chamber.

3. An electromagnetic vibration exciter according to claim 2 in which there is an oil-filled enclosure on the stationary body in combination with thermostatic means associated therewith indicating changes in oil temperature, and oil temperature changing means outside the chamber controlled by the thermostatic means.

4. An electromagnetic vibration exciter according to claim 2 in which the enclosure on the cover comprises a ring and a shield, said shield having clearance holes for the driving elements to pass through, together with flexible seals between the driving elements and shield; whereby the exciter may be operated in either a vertical or a horizontal position.

5. An electromagnetic vibration exciter according to claim 4 in which the oil depth is adjusted to cover all electrical connections to the armature.

References Cited in the file of this patent

UNITED STATES PATENTS

| 513,421 | Rowland | Jan. 23, 1894 |
| 2,084,561 | Prescott | June 22, 1937 |
| 2,632,858 | Calosi | Mar. 24, 1953 |
| 2,645,728 | Willson | July 14, 1953 |
| 2,717,319 | Bundy | Sept. 6, 1955 |

FOREIGN PATENTS

| 13,716 | Great Britain | of 1910 |